(12) United States Patent
Bush et al.

(10) Patent No.: US 11,249,103 B2
(45) Date of Patent: Feb. 15, 2022

(54) CUP ANEMOMETER WITH SINGLE PIECE ROTOR

(71) Applicant: NRG SYSTEMS, INC., Hinesburg, VT (US)

(72) Inventors: Henry B. Bush, Richmond, VT (US); Steven H. Clark, Hinesburg, VT (US)

(73) Assignee: NRG SYSTEMS, INC., Hinesburg, VT (US)

( * ) Notice: Subject to any disclaimer, the term of this patent is extended or adjusted under 35 U.S.C. 154(b) by 43 days.

(21) Appl. No.: 16/857,739

(22) Filed: Apr. 24, 2020

(65) Prior Publication Data

US 2020/0348330 A1 Nov. 5, 2020

Related U.S. Application Data

(60) Provisional application No. 62/842,683, filed on May 3, 2019.

(51) Int. Cl.
*G01P 5/06* (2006.01)
(52) U.S. Cl.
CPC ..................................... *G01P 5/06* (2013.01)
(58) Field of Classification Search
CPC ...... G01P 5/12; G01P 5/02; G01P 5/06; G01P 5/10; G01P 5/26; G01P 13/045; G01P 21/025; G01P 13/02; G01P 1/026; G01P 5/07; G01P 1/00; G01P 5/242; G01P 5/248; G01P 13/004; G01P 13/025; G01P 1/06; G01P 1/122; G01P 3/443; G01P 3/46; G01P 5/08; G01P 5/14; G01P 5/18; G01P 5/24; G01P 5/241; G01P 5/245; G01P 5/001; G01P 5/165; G01F 1/696; G01F 1/698; G01F 1/684; G01F 1/6965; G01F 1/6845;
(Continued)

(56) References Cited

U.S. PATENT DOCUMENTS 2,259,615 A 10/1941 Chappell et al.
3,020,963 A 2/1962 Hakkarinen
(Continued)

FOREIGN PATENT DOCUMENTS

EP 1482312 A1 * 12/2004 ............... G01P 5/06
EP 1489427 11/2008
WO WO-9711272 A1 * 3/1997 ............... F03D 7/06

OTHER PUBLICATIONS

Brochure; WindSensor P2546-OPR Cup Anemometer; windsensor.com; Jun. 11, 2018.

*Primary Examiner* — Andre J Allen
(74) *Attorney, Agent, or Firm* — Grossman, Tucker, Perrault & Pfleger, PLLC

(57) ABSTRACT

A cup anemometer providing accurate wind speed measurement in a cost-effective configuration. A rotor of the anemometer, e.g. a single-piece molded rotor, may be assembled to a shaft using a cap. In some embodiments, the hub of the rotor and the cap provide symmetry in the area of the cups and arms of the rotor and/or the bottom of the hub and the top of the cap may be positioned above and below, respectively, the planes defined by the tops and bottoms, respectively, of cups of the rotor. In some embodiments, each of the of the cups may be generally conical having a cone angle of nominally 114 degrees and/or each of the arms of the rotor may have a front surface that is co-planar with a front surface of an associated one of the cups.

20 Claims, 4 Drawing Sheets

(58) Field of Classification Search
CPC ... G01F 1/688; G01F 1/68; G01F 1/74; G01F 15/18; G01F 1/692; G01F 15/185; G01F 1/662; G01F 1/6842; G01F 1/69; G01F 1/6983; G01F 1/86; G01F 25/0053; G01F 5/00; G01F 1/667; G01F 1/6888; G01F 15/006; G01F 15/12; G01F 1/115; G01F 1/64; G01F 1/6986; G01F 1/699; G01F 15/024; G01F 15/063; G01F 15/14; G01F 1/10; G01F 1/103; G01F 1/12; G01F 1/28; G01F 1/661; G01F 1/665
See application file for complete search history.

(56) References Cited

U.S. PATENT DOCUMENTS

| | | | |
|---|---|---|---|
| 3,360,989 A | 1/1968 | Herrington | |
| 3,541,855 A | 11/1970 | Frenzen et al. | |
| 3,699,801 A * | 10/1972 | Jones | G01P 5/06 73/170.03 |
| 3,713,336 A | 1/1973 | Bernstein et al. | |
| 3,753,371 A | 8/1973 | Anderson | |
| 3,815,413 A * | 6/1974 | Marshall, III | G01P 13/02 73/170.16 |
| 4,078,426 A * | 3/1978 | Casani | G01P 5/06 73/170.03 |
| 4,102,188 A * | 7/1978 | Simerl | G01P 5/07 73/170.01 |
| 4,177,673 A * | 12/1979 | Krueger | G01F 1/10 384/420 |
| 4,543,836 A | 10/1985 | Call | |
| 5,639,963 A | 6/1997 | Sustare, Jr. | |
| 5,918,276 A | 6/1999 | Grindle et al. | |
| 6,895,812 B2 | 5/2005 | Dahlberg | |
| 8,443,682 B2 | 5/2013 | Hong | |
| 9,404,935 B2 | 8/2016 | Jones et al. | |
| 10,253,797 B2 | 4/2019 | Jones | |
| 2004/0083806 A1 | 5/2004 | Dahlberg | |
| 2009/0100923 A1 | 4/2009 | Stein | |
| 2012/0266692 A1 * | 10/2012 | Hong | G01P 5/06 73/861.85 |
| 2014/0137665 A1 * | 5/2014 | Heco | G01P 5/06 73/861.85 |
| 2015/0153373 A1 | 6/2015 | Jones et al. | |

* cited by examiner

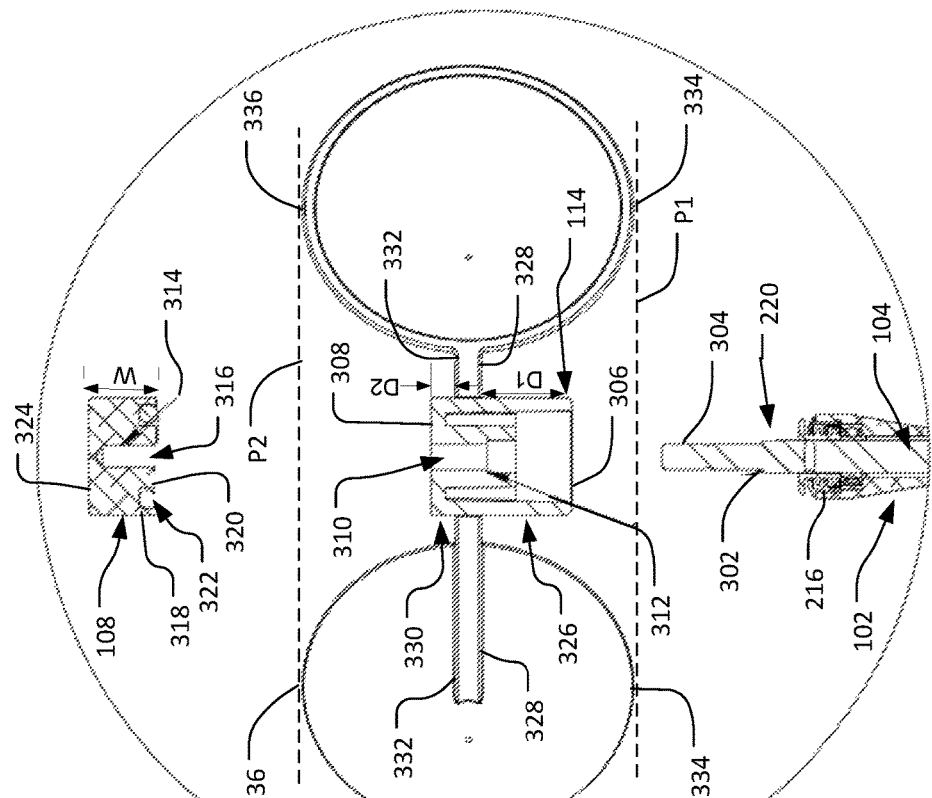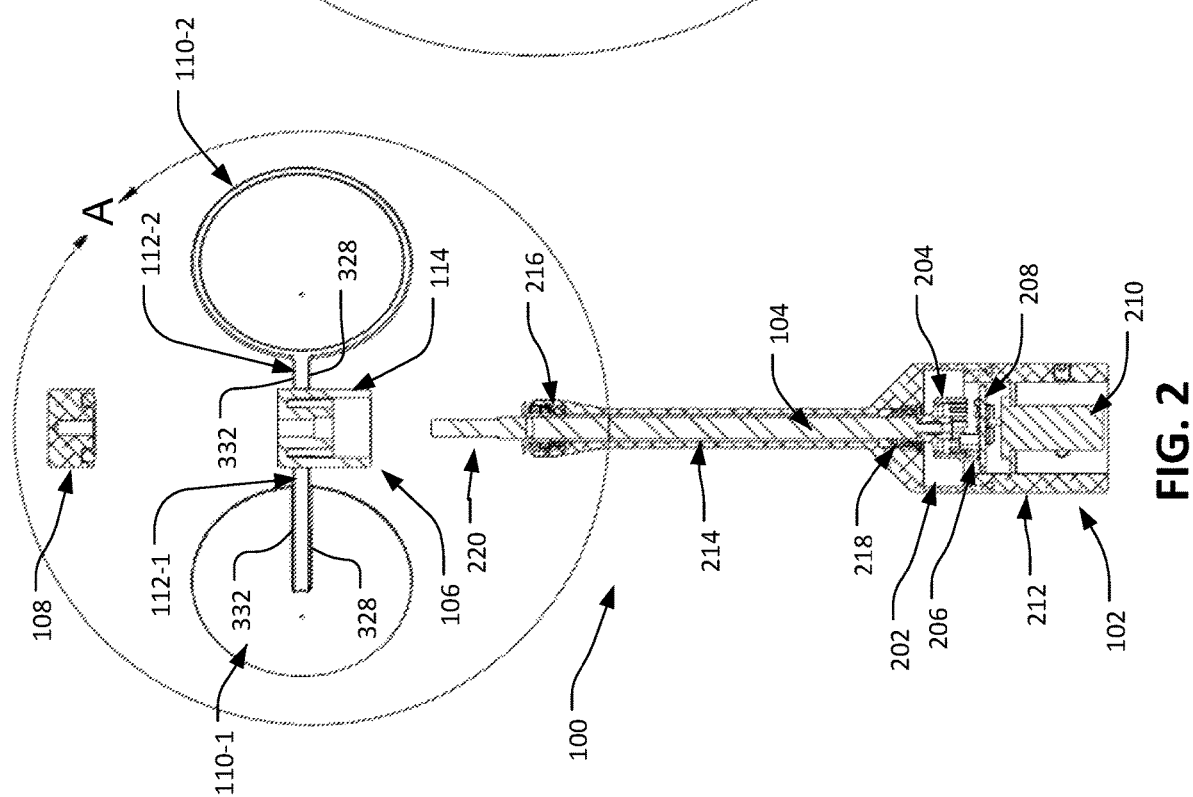

CUP ANEMOMETER WITH SINGLE PIECE ROTOR

CROSS-REFERENCE TO RELATED APPLICATIONS

This application claims the benefit of the filing date of U.S. Provisional Application Ser. No. 62/842,683 filed May 3, 2019, the teachings of which are hereby incorporated herein in their entirety.

TECHNICAL FIELD

The present disclosure generally relates to cup anemometers.

BACKGROUND INFORMATION

A cup anemometer is used to measure the speed of wind and generally includes a rotor including a plurality of cups attached to arms radiating from a central hub. The rotor is configured to rotate freely about a housing and is coupled to a shaft. In some configurations the cups may be generally conical or semi-spherical. Wind imparted on the cups causes corresponding rotation of the shaft. Rotation of the shaft is converted by a transducer to a signal representative of the speed of the wind imparted on the cups.

In some applications it is important to measure wind speed with high accuracy. In wind energy applications, for example, the power that may be obtained from a wind turbine is proportional to the speed of the wind. Also, it can be important to control the rotational speed of the turbine based on the wind speed.

The accuracy of the wind speed measurement is impacted by many factors including the geometry and orientation of the rotor components and the housing. Addressing these factors to produce a highly accurate anemometer can require expensive materials and manufacturing processes. Accuracy of the anemometer may thus be balanced with the cost of manufacture.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

FIG. 2 is an exploded sectional view of the anemometer illustrated in FIG. 1.

FIG. 3 is an enlarged view of the area A shown in FIG. 2.

DETAILED DESCRIPTION

An anemometer consistent with the present disclosure provides accurate wind speed measurement in a cost-effective configuration. A rotor of the anemometer, e.g. a single-piece molded rotor, may be assembled to a shaft using a cap. In some embodiments, the hub of the rotor and the cap may have the same cross-sectional shape and size to provide symmetry in the area of the cups and arms of the rotor. In some embodiments, the rotor may include a hub that extends a distance below the bottom surface of the arms by the same distance that the hub and cap extend above the top surface of the arms and/or the bottom of the hub and the top of the cap may be positioned above and below, respectively, the planes defined by the tops and bottoms, respectively, of the cups. In some embodiments, each of the plurality of cups may be generally conical having a cone angle of nominally 114 degrees and/or each of the arms of the rotor may have a front surface that is co-planar with a front surface of an associated one of the cups. Each of these features contributes to accurate performance and/or manufacturability of the anemometer and an anemometer consistent with the present disclosure may include any one or more, or all, of these features and other features described herein.

Figure 1:
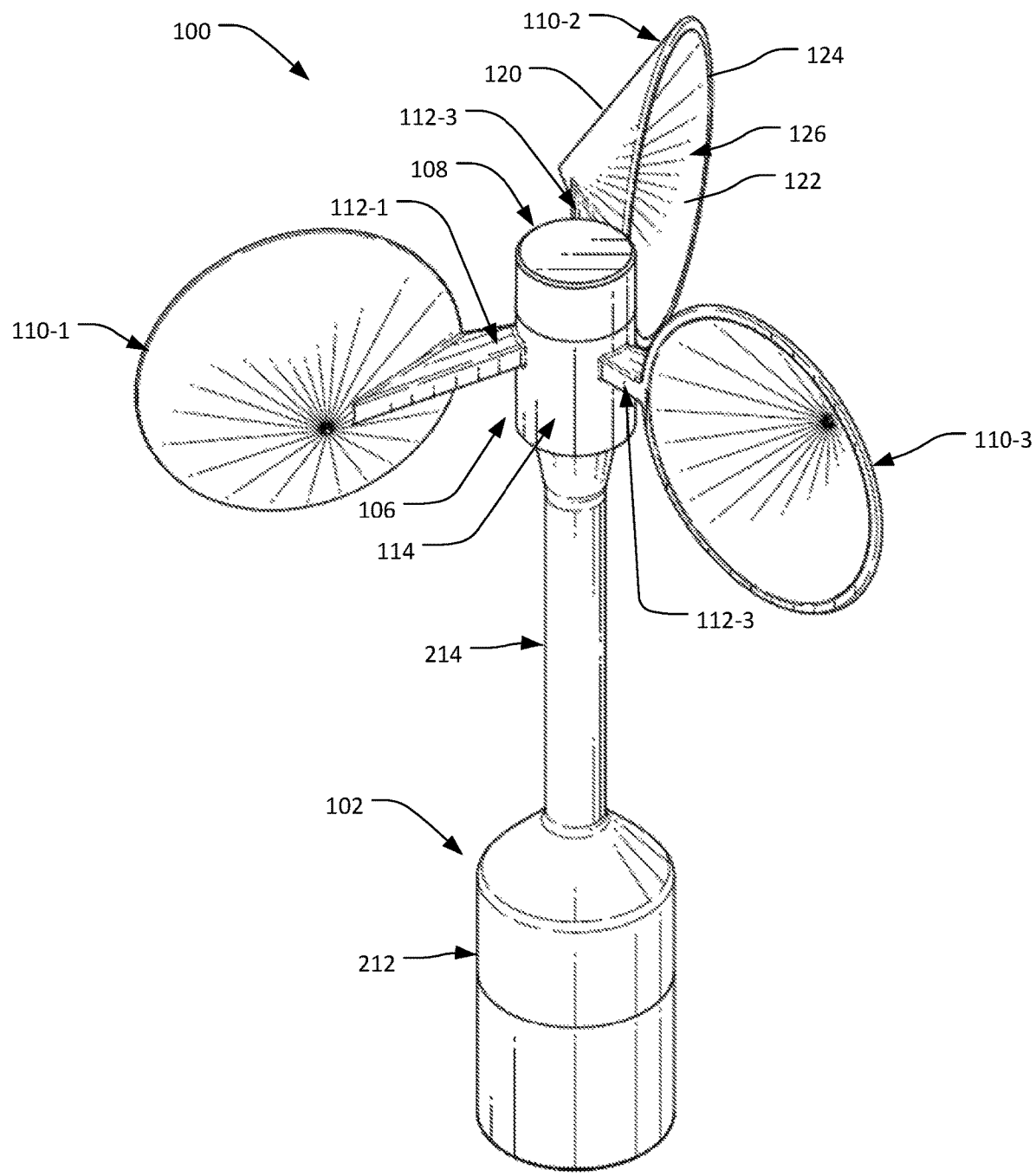
FIG. 1 is a perspective view of one example of an anemometer consistent with the present disclosure.

FIG. 1 is a perspective view and FIG. 2 is a cross-sectional view of one example of an anemometer 100 consistent with the present disclosure. The anemometer 100 includes a housing 102, a shaft 104 (FIG. 2) rotatably supported in the housing 102, a rotor 106 and a cap 108 for securing the rotor 106 to the shaft 104 so that the rotor 106 and the shaft 104 rotate together with respect to the housing 102. The rotor 106 includes a plurality of cups 110-1, 110-2, 110-3 attached to the ends of associated arms 112-1, 112-2, 112-3 radiating from a central hub 114. Although the illustrated embodiment includes a rotor 106 having three cups 110-1, 110-2, 110-3, an anemometer consistent with the present disclosure may include two cups or more than three cups.

In general, wind imparted on the cups 110-1, 110-2, 110-3 causes rotation of the rotor 106 and the shaft 104 relative to the housing 102. A transducer 202 converts the rotation of the shaft 104 to a signal representative of the speed of the wind imparted on the cups 110-1, 110-2, 110-3. In the illustrated example, the transducer 202 includes an annular optical chopper 204 coupled to the shaft 104 for rotation therewith. The optical chopper 204 passes through a photointerrupter 206 so that the output of the photointerrupter 206 is a series of pulses having a frequency proportional to the rotational speed of the shaft 104. Since the rotational speed of the shaft 104 is proportional to the wind speed, the output of the photointerrupter 206 is representative of the speed of the wind imparted on the cups 110-1, 110-2, 110-3.

The photointerrupter 206 is mounted on a circuit board 208 carrying an interface and power circuit for the photointerrupter 206. The output of the photointerrupter 206 is coupled to an electrical connector 210 to provide an output of the anemometer 100. Power to the anemometer 100 may be provided through the electrical connector 210 or may be provided by a battery supply. Although the transducer 202 in the illustrated embodiment includes an optical chopper 204 and photointerrupter 206 a variety of other transducer configurations are well-known in the art and may be implemented in a system consistent with the present disclosure.

The housing 102 includes a base portion 212 and an upper portion 214 extending upwardly from the base portion 212. The base portion 212 of the housing 102 encloses the transducer 202 and the electrical connector 210. The shaft 104 is received in a central opening extending through the upper portion 214 of the housing 102 and into the base portion 212. The shaft 104 is supported for rotation in the central opening of the housing 102 by a first bearing 216 positioned at the top of the upper portion 214 and a second bearing 218 positioned at a top of the base portion 212.

In some embodiments, the shaft 104 may be a generally cylindrical rod that includes a reduced diameter bottom portion for coupling the shaft 104 to the optical chopper 204.

The reduced diameter bottom portion may include exterior threads that mate with interior threads in a base of the optical chopper 204 for securing the optical chopper 204 to the shaft 104. A connector portion 220 may be provided at an upper end of the shaft 104 and extends beyond the upper portion 214 of the housing 102 to facilitate mounting the rotor 106 to the shaft 104. The connector portion 220 may be defined by a reduced diameter portion of the shaft 104 defining a shoulder 302, as shown more clearly in FIG. 3. External threads 304 may be provided at an end of the connector portion 220.

Figure 4:
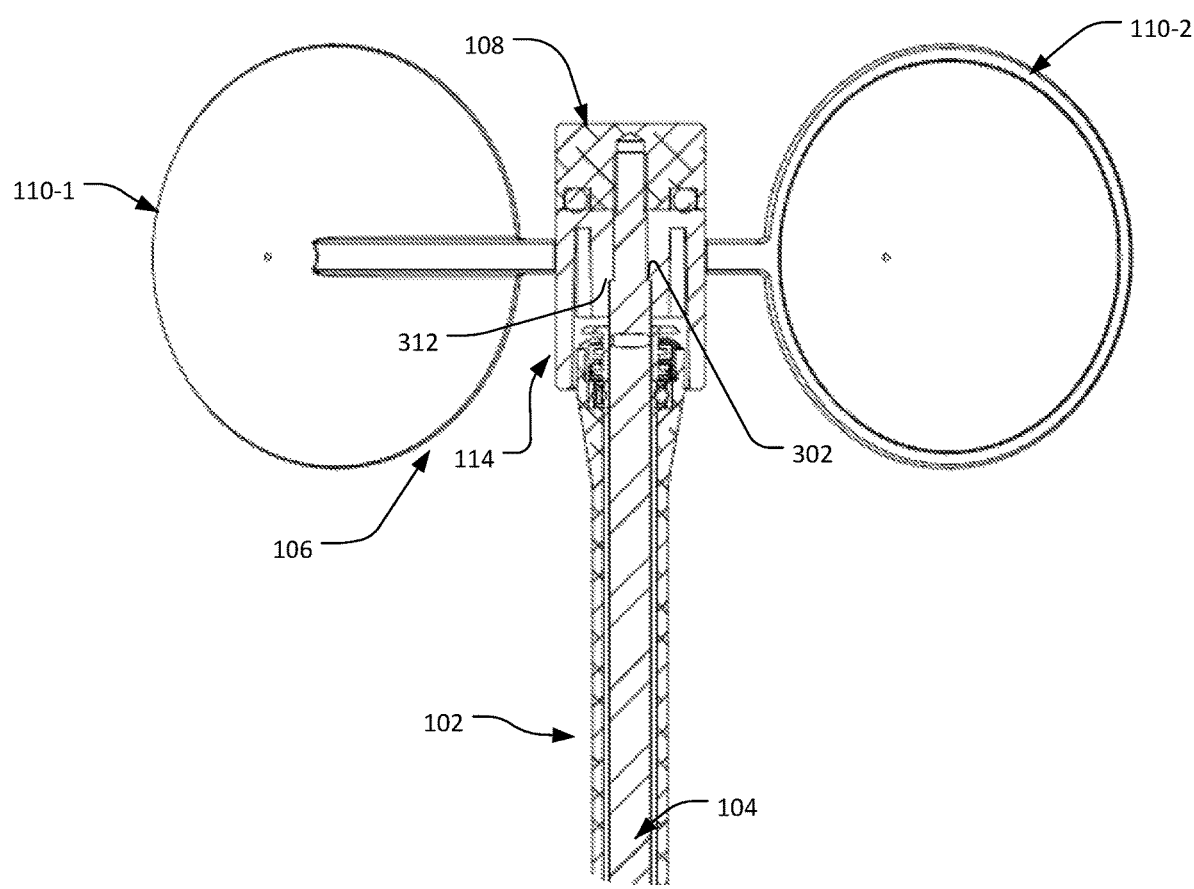
FIG. 4 is an assembled sectional view of a portion of the anemometer illustrated in FIG. 1.

In some embodiments, the hub 114 of the rotor 106 has a perimeter surface with a uniform cross-sectional shape from a bottom surface 306 to a top surface 308 of the hub 114 in planes taken parallel to the bottom surface 306 of the hub 114. In the illustrated embodiment, for example, the hub 114 is cylindrical and the cross-sectional shape of the perimeter surface of the hub 114 is circular from the bottom surface 306 to a top surface 308 of the hub 114 in planes parallel with the bottom surface 306 of the hub 114. The hub 114 may include a central opening 310 therethrough having a first portion and a second portion of reduced diameter compared to the first portion. A shoulder 312 is defined at the transition between the first portion and the second portion of the central opening 310. With reference also the assembled cross-sectional view of FIG. 4, the connector portion 220 of the shaft 104 may extend through the central opening 310 in the hub 114 and the shoulder 312 in the central opening 310 of the hub 114 may rest on the shoulder 302 of the connector portion 220 of the shaft 104.

The top of the connector portion 220 of the shaft 104 extends beyond the upper portion of the hub 114 so that the external threads 304 on the connector portion 220 are exposed. In the illustrated example embodiment, the rotor 106 is secured to the shaft 104 by threaded engagement of the external threads 304 of the connector portion 220 of the shaft 104 and mating internal threads 314 in a central opening 316 in the cap 108. The cap 108 includes an annular groove 318 in a bottom surface 320 thereof for receiving an O-ring 322. As the cap 108 is threaded onto the connector portion 220 of the shaft 104 the internal threads 314 on the cap 108 threadably engage the external threads 304 of the connector portion 220 and a compressive force is applied to the O-ring 322. This force is transferred to the hub 114 of the rotor 106 to force engagement of the shoulder 312 on the hub 114 with the shoulder 302 of the connector portion 220 of the shaft 104 and secure and seal the rotor 106 and the cap 108 to the shaft 104. When the illustrated example embodiment is assembled, the rotor 106, cap 108 and shaft 104 rotate together with respect to the housing 102.

Although in the illustrated example embodiment, the cap 108 is configured to secure the rotor 106 to the shaft 104 using a threaded engagement, other configurations for securing the rotor 106 to the shaft 104 using the cap 108 may be implemented in an anemometer consistent with the present disclosure. For example, the cap 108 may be secured to the shaft 104 using a fastener and/or press fit. Also, in some embodiments the cap 108 may couple the rotor 106 to the shaft 104 without being coupled to the shaft 104. For example, the shaft 104 may be configured as a cylindrical rod with a central opening and an interior rod (not shown) coupled to the housing 102 may extend through the central opening in the shaft 104. The cap 108 may be coupled to the interior rod and the rotor 106 and shaft 104 may rotate relative to the cap 108, rod and housing 102.

The illustrated cap 108 has perimeter surface having a uniform cross-sectional shape from the bottom surface 320 to a top surface 324 of the cap 108 in planes parallel with the bottom surface 320 of the cap 108. In the illustrated embodiment, for example, the cap 108 is cylindrical and the cross-sectional shape of the perimeter surface of the cap 108 is circular from a bottom surface 320 of the cap 108 to the top surface 324 of the cap 108 in planes parallel with the bottom surface 320 of the cap 108. The uniform cross-sectional shape of the perimeter surface of the cap 108 may be the same cross-sectional shape and size as the uniform cross-sectional shape of the perimeter surface of the hub 114 portion of the rotor 106. In the illustrated embodiment, for example, the cap 108 has a cylindrical cross-sectional shape having the same diameter as the cross-sectional shape of the hub 114.

With reference in particular to the example shown in FIG. 3, the hub 114 includes a bottom portion 326 extending below the bottom surfaces 328 of the arms 112-1, 112-2, 112-3 by a distance D1 and an upper portion 330 extending above the upper surfaces 332 of the arms 112-1, 112-2, 112-3 by a distance D2. The cap 108 has a width W from the top surface 324 of the cap 108 to the bottom surface 320 of the cap 108. Since the hub 114 and the cap 108 both have a cylindrical cross-sectional shape, the bottom portion 326 of the hub 114 is symmetrical with the top portion 330 of the hub 114 combined with the cap 108 when the bottom surface 320 of the cap 108 is positioned adjacent the top surface 308 of the hub 114, e.g. when the O-ring 322 is compressed between the cap 108 and the hub 114 in the example embodiment. This provides symmetry above and below the arms 112-1, 112-2, 112-3 in the area of the hub 114 and cups 110-1, 110-2, 110-3 to avoid wind currents that might otherwise impact performance of the anemometer 100. In some embodiments, symmetry above and below the arms 112-1, 112-2, 112-3 may be achieved using non-uniform cross-sectional shapes, such as cones. For example, the bottom portion 326 of the hub 114 can be shaped as a cone and the top portion 330 of the hub 114 combined with the cap 108 may also form cone to provide symmetry above and below the arms 112-1, 112-2, 112-3.

In some embodiments, the distance D1 may be equal to the distance D2 plus the width W so that the hub 114 extends below the arms 112-1, 112-2, 112-3 by the same distance that the hub 114 and cap 108 extend above the arms 112-1, 112-2, 112-3. This configuration provides symmetry above and below the arms 112-1, 112-2, 112-3 while at the same time allowing facile assembly of the rotor 106 to the shaft 104 using threaded engagement of the cap 108 to the shaft 104. In some embodiments, the bottom surface 306 of the hub 114 may be positioned above a bottom plane P1 of defined by the bottoms 334 of the cups 110-1, 110-2, 110-3 and the top surface 324 of the cap 108 may be positioned below a top plane P2 defined by the tops 336 of the cups 110-1, 110-2, 110-3.

Figure 5:
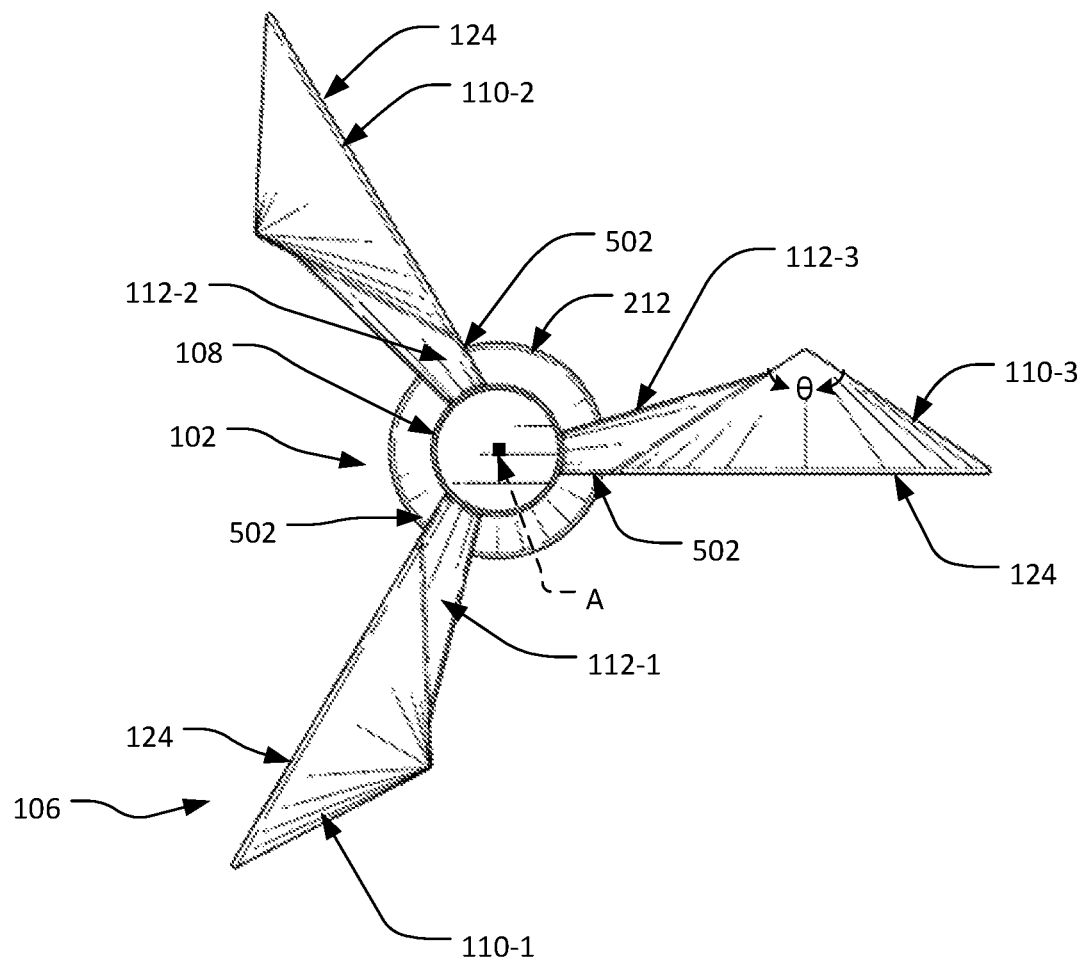
FIG. 5 is a top view of the anemometer illustrated in FIG. 1.

With reference now to FIG. 5, in some embodiments, the rotor 106 may be a single-piece construction, e.g. molded from a plastic material, co-molded from different materials to form an integral structure, or 3D printed. This configuration allows for cost-effective manufacturing, especially when combined with a cap 108 that secures the rotor 106 to the shaft 104 using a threaded engagement of the cap 108 to the shaft 104. As best shown in FIG. 1 and with reference, for example, to the cup 110-2, each of the cups 110-1, 110-2, 110-3 may be generally conical with a convex outer surface 120 and a convex inner surface 122 that meet a front surface 124 to define an opening 126 to the cup. As shown in FIG. 5, the cone angle θ defined by the cup may be nominally greater than 90 degrees and, in some embodiments nominally about 114 degrees. The front surfaces 124 of the cups 110-1, 110-2, 110-3 may be co-planar with the front surfaces 502 of the arms 112-1, 112-2, 112-3 and may be positioned forward of the axis A of rotation of the shaft 104.

In accordance with an aspect of the present disclosure there is provided a cup anemometer including a housing; a shaft supported by the housing for rotation relative to the housing, the shaft having a connector portion at an end thereof, the connector portion having a threaded exterior surface; a single piece rotor comprising a plurality of cups attached to arms radiating from central hub, the hub having a central opening therein for receiving the connector portion of the shaft with the threaded exterior surface of the connector portion extending beyond a top surface of the hub; and a cap having a central opening with a threaded internal surface for threadably engaging the threaded external surface of the connector portion of the shaft for coupling the cap, the rotor and the shaft for rotation together with respect to the housing.

According to another aspect of the present disclosure there is provided a cup anemometer including a housing; a shaft supported by the housing for rotation relative to the housing; a single piece rotor comprising a plurality of cups attached to arms radiating from central hub, the hub having a bottom portion extending below a bottom surface of the arms and a top portion extending above a top surface of the arms; and a cap configured to secure the rotor to the shaft whereby the rotor and the shaft rotate together with respect to the housing, the bottom portion of the hub being symmetrical to the top portion of the hub combined with the cap when a bottom surface of the cap is positioned adjacent a top surface of the hub.

According to yet another aspect of the disclosure, there is provided a cup anemometer including a housing; a shaft supported by the housing for rotation relative to the housing, the shaft having a connector portion at an end thereof, the connector portion having a threaded exterior surface; a single-piece rotor comprising a plurality of cups attached to arms radiating from central hub, each of the cups having associated tops and bottoms, the hub having a uniform cross-sectional shape and having a central opening therein for receiving the connector portion of the shaft with the threaded exterior surface of the connector portion extending beyond a top surface of the hub, the hub having a bottom portion extending a first distance from a bottom surface of one of the arms to a bottom surface of the hub and a top portion extending a second distance from a top surface of the one of the arms to the top surface of the hub; a cap having a uniform cross-sectional shape that is the same shape and size as the uniform cross-sectional shape of the hub, the cap having a central opening with a threaded internal surface for threadably engaging the threaded external surface of the connector portion of the shaft for coupling the cap, the rotor and the shaft for rotation together with respect to the housing, the cap having a width from a top surface of the cap to a bottom surface of the cap, whereby the first distance is equal to the second distance plus the width of the cap and the bottom surface of the hub is positioned above a plane defined by the bottoms of the cups and the top surface of the cap is positioned below a plane defined by the tops of the cups.

Throughout the entirety of the present disclosure, use of the articles "a" and/or "an" and/or "the" to modify a noun may be understood to be used for convenience and to include one, or more than one, of the modified noun, unless otherwise specifically stated. The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary. References herein to geometrical features and relationships, such as "uniform cross-section" the "same", "symmetrical", "circular", "cylindrical", "equal", "co-planar", etc. do not require exact mathematical precision, but instead allow for manufacturing tolerances and inconsistencies. Use of the term "nominal" or "nominally" when referring to an amount means a designated or theoretical amount that may vary from the actual amount, e.g. due to manufacturing tolerances or inconsistencies. The terms "comprising", "including" and "having" are intended to be inclusive and mean that there may be additional elements other than the listed elements.

Those skilled in the art will recognize or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure. Future-filed applications claiming priority to this application may claim the disclosed subject matter in a different manner and generally may include any set of one or more limitations as variously disclosed or otherwise demonstrated herein.

What is claimed is:

1. A cup anemometer comprising:
   a housing;
   a shaft supported by the housing for rotation relative to the housing, the shaft having a connector portion at an end thereof, the connector portion having a threaded exterior surface;
   a single piece rotor comprising a plurality of cups attached to arms radiating from a central hub, the hub having a central opening therein for receiving the connector portion of the shaft with the threaded exterior surface of the connector portion extending beyond a top surface of the hub; and
   a cap having a central opening with a threaded internal surface for threadably engaging the threaded external surface of the connector portion of the shaft for coupling the cap, the rotor and the shaft for rotation together with respect to the housing.

2. The cup anemometer of claim 1, wherein the hub has bottom portion extending below a bottom surface of the arms and a top portion extending above a top surface of the arms, and wherein the bottom portion of the hub is symmetrical to the top portion of the hub combined with the cap when a bottom surface of the cap is positioned adjacent the top surface of the hub.

3. The cup anemometer of claim 1, wherein the hub has a uniform cross-sectional shape, and wherein the cap has a uniform cross-sectional shape that is the same shape and size as the uniform cross-sectional shape of the hub.

4. The cup anemometer of claim 1, wherein the hub has a bottom portion extending a first distance from a bottom surface of one of the arms to a bottom surface of the hub and a top portion extending a second distance from a top surface of the one of the arms to the top surface of the hub, and wherein the cap has a width from a top surface of the cap to a bottom surface of the cap, whereby the first distance is equal to the second distance plus the width of the cap.

5. The cup anemometer of claim 1, wherein each of the plurality of cups have a top and a bottom, and wherein a bottom surface of the hub is positioned above a plane defined by the bottoms of the cups and a top surface of the cap is positioned below a plane defined by the tops of the cups.

6. The cup anemometer of claim 1, wherein each of the arms has a front surface that is co-planar with a front surface of an associated one of the cups.

7. The cup anemometer of claim 1, wherein each of the plurality of cups is conical having a cone angle of nominally 114 degrees.

8. The cup anemometer of claim 1, wherein the cap has an annular groove formed in a bottom surface thereof and wherein the anemometer further comprises an O-ring disposed in the annular groove.

9. A cup anemometer comprising:
a housing;
a shaft supported by the housing for rotation relative to the housing;
a single piece rotor comprising a plurality of cups attached to arms radiating from a central hub, the hub having a bottom portion extending below a bottom surface of the arms and a top portion extending above a top surface of the arms; and
a cap configured to secure the rotor to the shaft whereby the rotor and the shaft rotate together with respect to the housing, the bottom portion of the hub being symmetrical to the top portion of the hub combined with the cap when a bottom surface of the cap is positioned adjacent a top surface of the hub.

10. The cup anemometer of claim 9, wherein the cap is configured to threadably engage the shaft to secure the rotor to the shaft.

11. The cup anemometer of claim 9, wherein the hub has a uniform cross-sectional shape, and wherein the cap has a uniform cross-sectional shape that is the same shape and size as the uniform cross-sectional shape of the hub.

12. The cup anemometer of claim 9, wherein the bottom portion of the hub extends a first distance from the bottom surface the arms to a bottom surface of the hub, and wherein the top portion of the hub extends a second distance from the top surface of the arms to the top surface of the hub, and wherein the cap has a width from a top surface of the cap to the bottom surface of the cap, whereby the first distance is equal to the second distance plus the width of the cap.

13. The cup anemometer of claim 9, wherein each of the plurality of cups have a top and a bottom, and wherein a bottom surface of the hub is positioned above a plane defined by the bottoms of the cups and a top surface of the cap is positioned below a plane defined by the tops of the cups.

14. The cup anemometer of claim 9, wherein each of the arms has a front surface that is co-planar with a front surface of an associated one of the cups.

15. The cup anemometer of claim 9, wherein each of the plurality of cups is conical having a cone angle of nominally 114 degrees.

16. The cup anemometer of claim 9, wherein the cap has an annular groove formed in the bottom surface thereof and wherein the anemometer further comprises an O-ring disposed in the annular groove.

17. A cup anemometer comprising:
a housing
a shaft supported by the housing for rotation relative to the housing, the shaft having a connector portion at an end thereof, the connector portion having a threaded exterior surface;
a single-piece rotor comprising a plurality of cups attached to arms radiating from a central hub, each of the cups having associated tops and bottoms, the hub having a uniform cross-sectional shape and having a central opening therein for receiving the connector portion of the shaft with the threaded exterior surface of the connector portion extending beyond a top surface of the hub, the hub having a bottom portion extending a first distance from a bottom surface of one of the arms to a bottom surface of the hub and a top portion extending a second distance from a top surface of the one of the arms to the top surface of the hub; and
a cap having a uniform cross-sectional shape that is the same shape and size as the uniform cross-sectional shape of the hub, the cap having a central opening with a threaded internal surface for threadably engaging the threaded external surface of the connector portion of the shaft for coupling the cap, the rotor and the shaft for rotation together with respect to the housing, the cap having a width from a top surface of the cap to a bottom surface of the cap, whereby the first distance is equal to the second distance plus the width of the cap and the bottom surface of the hub is positioned above a plane defined by the bottoms of the cups and the top surface of the cap is positioned below a plane defined by the tops of the cups.

18. The cup anemometer of claim 17, wherein each of the arms has a front surface that is co-planar with a front surface of an associated one of the cups.

19. The cup anemometer of claim 17, wherein each of the plurality of cups is conical having a cone angle of nominally 114 degrees.

20. The cup anemometer of claim 17, wherein the cap has an annular groove formed in the bottom surface thereof and wherein the anemometer further comprises an O-ring disposed in the annular groove.

* * * * *